United States Patent [19]

Kondo

[11] 4,117,500
[45] Sep. 26, 1978

[54] AUTOMATIC EXPOSURE CONTROL APPARATUS IN A CAMERA

[75] Inventor: Toshihiro Kondo, Chofu, Japan

[73] Assignees: Toshihiro Kondo, Tokyo; Fuji Photo Film Co., Ltd., Minami-ashigara,, Japan; Minami-ashigara, both of

[21] Appl. No.: 725,995

[22] Filed: Sep. 23, 1976

[30] Foreign Application Priority Data

Sep. 23, 1975 [JP] Japan .................................. 50-115069

[51] Int. Cl.$^2$ .............................................. G03B 7/08
[52] U.S. Cl. .................................. 354/23 D; 354/38; 354/60 A
[58] Field of Search ..................... 354/23 R, 23 D, 29, 354/37, 38, 43, 44, 50, 51, 60 R, 60 A, 59

[56] References Cited

U.S. PATENT DOCUMENTS

| 3,978,497 | 8/1976 | Kondo | 354/43 |
| 3,987,461 | 10/1976 | Kondo | 354/43 |
| 3,995,285 | 11/1976 | Kondo | 354/23 R |

*Primary Examiner*—Russell E. Adams
*Attorney, Agent, or Firm*—Fleit & Jacobson

[57] ABSTRACT

Automatic exposure control apparatus for automatic setting of exposure parameters wherein the settings for any two of three exposure control parameters, namely, diaphragm aperture, shutter speed and filter transmittance, are preselected and the setting for the remaining parameter is automatically determined thereafter in accordance with the settings for the two preselected settings and other uncontrollable parameters. The exposure control apparatus includes signal supply means which provide pulse signals corresponding to the two preselected settings and arithmetic operation means which performs arithmetic operations on the pulse signals corresponding to the preselected settings and other pulse signals which correspond to the measured intensity of the light illuminating the object to be photographed and to the speed of the film loaded in the camera, and produces a pulse signal which controls the remaining exposure control parameter.

4 Claims, 12 Drawing Figures

AUTOMATIC EXPOSURE CONTROL APPARATUS IN A CAMERA

BACKGROUND OF THE INVENTION

1. Field of the Invention

This invention relates to an automatic exposure control apparatus, and more particularly to an automatic exposure control apparatus for use in a camera in which exposure is controlled on the basis of three-parameters, for example diaphragm aperture, shutter speed and filter transmittance, and in which proper exposure can automatically be determined by preselecting the settings for any two of three parameters and by then automatically determining the setting for the remaining parameter in accordance with the preselected settings for the two preselected parameters.

2. Description of the Prior Art

In the system commonly used in conventional cameras with a built-in automatic exposure control apparatus, either the diaphragm aperture setting or the shutter speed setting is preselected while the remaining setting is automatically determined thereafter in accordance with the preselected settings and in consideration of prevailing light conditions. There is also known a programmed-type camera which permits exposure control to be accomplished by automatic setting of both the diaphragm aperture and the shutter speed at one time. In the two types of cameras mentioned above, two exposure control parameters, ordinarily diaphragm aperture and shutter speed, are employed for controlling exposure. In controlling the exposure in accordance with these cameras, the speed of the film loaded in the camera is also a factor which determines the proper exposure. In taking pictures, however, the diaphragm aperture setting plays a very important role not only in adjusting the exposure to the scene brightness but also in determining the focal depth, and the sutter speed setting is a predominant determining factor in blurring of the photographed image. Therefore, the settings for these two exposure parameters should preferably be preselected according to the aims of the photographer so that he may obtain the desired depth of field and degree of clarity (or blur) in the photographed image. In accordance with the conventional automatic exposure control cameras mentioned above, the setting for one or the other of the two parameters is preselected and the setting for the other parameter is determined solely on the basis of the setting for the preselected parameter. However, such a system does not give the photographer the desired freedom in selection of conditions and therefore presents a problem regarding convenience of operation.

In order to overcome this problem, the so-called three-parameter controlled exposure camera has been developed. In this type of camera, the settings for two parameters, for example, diaphragm aperture and shutter speed, are first preselected according to the aims of the photographer, and the exposure is then adjusted by setting the transmittance of a variable filter in accordance with the preselected settings of the first two parameters. In operating the above camera, it may also happen that when an object is to be photographed under certain ambient light conditions or a certain speed of film is to be used, the amount of light through the variable filter should preferably first be set and one or the other of the shutter speed and diaphragm aperture should be set thereafter in consideration of the light conditions or the film speed. This type of camera should desirably be so arranged that it permits any two of the three parameters to be preselected.

SUMMARY OF THE INVENTION

In the light of the disadvantages and problems of the prior art stated above, it is a principal object of the present invention to provide an automatic exposure control apparatus in a three-parameter controlled exposure camera, by which appropriate exposure can automatically be obtained by preselecting the settings for any two of the exposure parameters among the filter transmittance, the diaphragm aperture and the shutter speed and thereafter automatically selecting the setting for the remaining exposure parameter in accordance with the preselected settings. The automatic exposure control apparatus according to this invention is characterized by the fact that any two of the exposure parameters among the filter transmittance, the diaphragm aperture and the shutter speed are first set while the setting for the remaining parameter is automatically effected thereafter, this operation being accomplished automatically by means of circuitry described hereinafter. Preselection of the settings for two of the three exposure control parameters causes corresponding signal supply means to produce output pulse signals each of which corresponds to one of the two preselected settings. These pulse signals, a pulse signal corresponding to the intensity of the light illuminating the object and another corresponding to the speed of the film are fed to an arithmetic operation means which produces an output signal which automatically controls an exposure control means for setting the other parameter. In accordance with this invention, the above arithmetical operations are performed in accordance with the Additive Photographic Exposure System (known as the APEX system) whereby the appropriate settings for the exposure parameters can be determined by addition and subtraction operations. Given the shutter speed index TV, diaphragm aperture index AV, illumination intensity index BV, film speed index SV, and the filter transmittance index FV, the relationship between the above indices can be expressed as follows:

$$BV + SV - Av - TV - FV = 0 \qquad (1)$$

provided that the filter transmittance index is so determined that its value is "0" when the fiter transmittance is "1" (maximum) and increases by one to 1, 2, 3 ..., each time the filter transmittance decreases by one half to $\frac{1}{2}, \frac{1}{4}, \frac{1}{8}$ .... From the fact that the film speed index SV is fixed once the camera is loaded with film and the illumination intensity index BV depends solely upon the ambient light conditions, it follows that if any two among the shutter speed index TV, the diaphragm aperture index AV and the filter transmittance index FV are preselected, the value of the remaining parameter can be determined from the above equation. Values of the exposure control parameters and the indices corresponding to these values are shown in Table 1 below.

Table 1

| Index number (BV, SV, TV, AV, FV) | 0 | 1 | 2 | 3 | 4 | 5 | 6 | 7 | 8 | 9 | 10 |
| --- | --- | --- | --- | --- | --- | --- | --- | --- | --- | --- | --- |
| Illumination intensity (B) (Cd/m$^2$) | 3.43 | 6.85 | 13.70 | 27.41 | 54.8 | 109.6 | 219 | 439 | 877 | 1750 | 3510 |
| Film Speed (S) (ASA) | 3 | 6 | 12 | 25 | 50 | 100 | 200 | 400 | 800 | 1600 | 3200 |
| Shutter Speed (T) (sec) | 1 | 1/2 | 1/4 | 1/8 | 1/15 | 1/30 | 1/60 | 1/125 | 1/250 | 1/500 | 1/1000 |
| Aperture (A) (f-number) | 1 | 1.4 | 2.0 | 2.8 | 4 | 5.6 | 8 | 11 | 16 | 22 | 32 |
| Filter transmittance (F) | 1 | 1/2 | 1/4 | 1/8 | 1/16 | 1/32 | 1/60 | 1/125 | 1/250 | 1/500 | 1/1000 |

For easier understanding, assume by way of example that the speed of the film is ASA 3200 ($SV = 10$) and the illumination intensity is 3510 ($BV = 10$) and that the shutter speed and diaphragm aperture settings are preselected and the filter transmittance setting is automatically controlled thereafter. If the shutter speed is set at 1/250 and the aperture is set at $f$ 11, then the shutter speed index TV will be 8 and the aperture index AV will be 7. As the filter transmittance setting is not preselected in this instance, the value FV is set initially to "0" for entry into the calculation. From the above equation (1), therefore, the relationship can be expressed in terms of $(10 + 10) - 7 - 8 - 0 = 5$. A signal corresponding to the value "5" resulting from the equation is fed to the filter control circuit, and the transmittance of the variable filter is adjusted so that the transmittance index FV becomes 5. A different two parameters may of course be preselected and the remaining parameter determined by similar arithmetic operations.

BRIEF DESCRIPTION OF THE DRAWINGS

Other objects, features and advantages of the invention will become apparant from the remainder of the specification, the appended claims and the accompanying drawings, in which:

DESCRIPTION OF THE PREFERRED EMBODIMENTS

Figure 1:
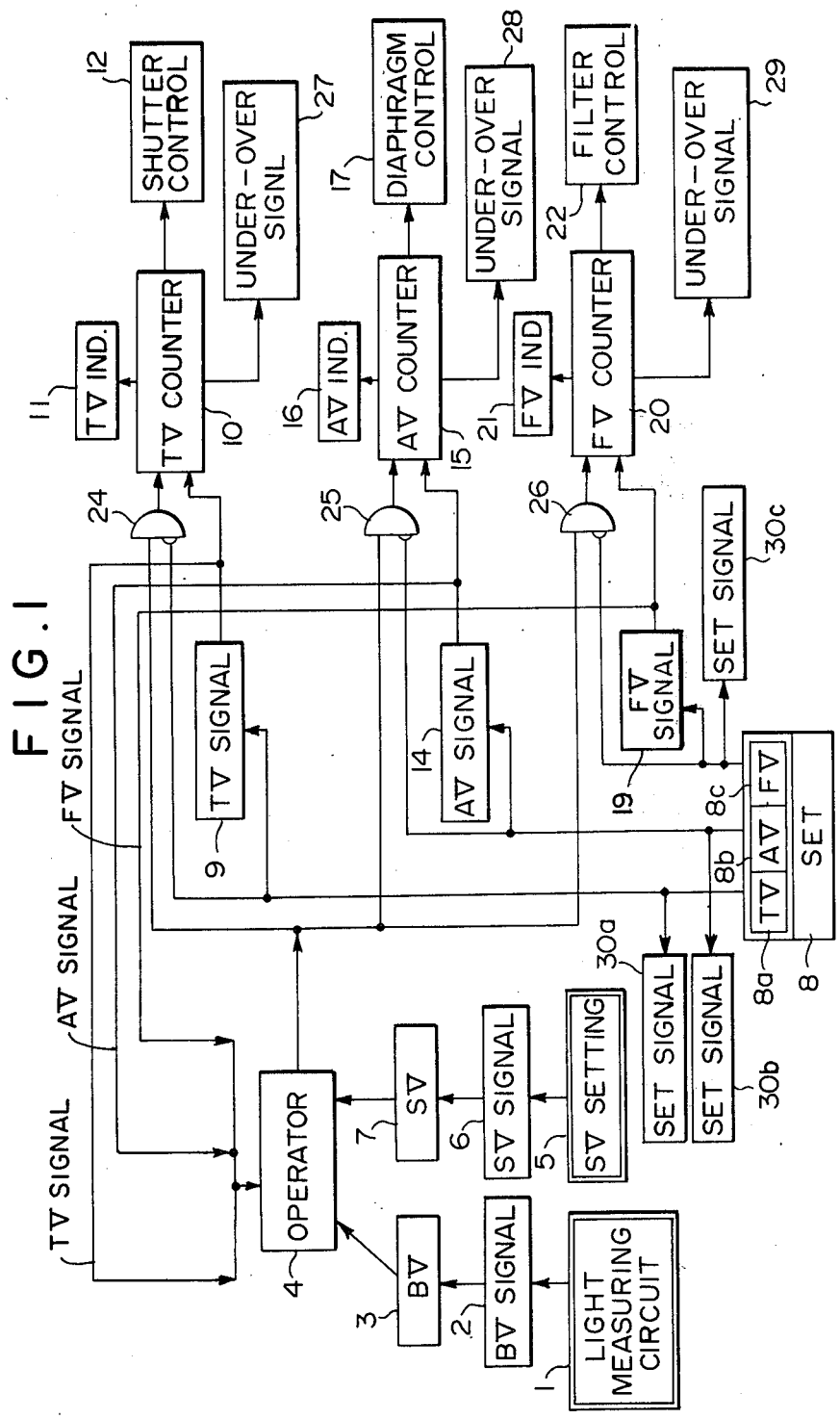
FIG. 1 is a block diagram illustrating the circuit arrangement of the automatic exposure control apparatus in accordance with this invention.

The present invention will be further described with reference to the accompanying drawings. FIG. 1 is a block diagram showing the general arrangement of the exposure control circuit according to this invention. In FIG. 1, light measuring circuit 1 includes a photoconductive element such as a Cds cell or a photovoltaic element such as a photodiode, a phototransistor or the like, and is adapted to measure scene illumination intensity. Light measuring circuit 1 is connected to signal supply circuit 2 which produces an output signal proportional to the measured illumination intensity. The output of circuit 2 is a number of pulse signals corresponding to the index BV of the measured illumination intensity. These pulse signals are fed to arithmetic circuit 4. Film-speed setting circuit 5 is linked to the ASA film-speed dial on the camera. The output signal from circuit 5 is fed as film-speed information to signal supply circuit 6 which produces output pulses in a number equal to the film-speed index SV. These pulses are also fed to arithmetic circuit 4. The three exposure control parameters mentioned above, namely, shutter speed index TV, diaphragm aperture index AV and filter transmittance index FV, can be set by means of circuit 8 which provides output pulse signals corresponding to the preselected parameter setting information. When, for example, it is desired that the shutter speed setting be preselected, the shutter speed dial or set ring is set at the desired shutter speed value. This causes sub-circuit 8a of circuit 8 to produce an output corresponding to the selected shutter speed which is then fed as shutter speed setting information to signal circuit 9. Circuit 9 produces output pulses in a number equal to the shutter speed index TV. These pulses are fed to TV counter circuit 10. The contents of TV counter circuit 10 are supplied to shutter speed setting indicator 11 which displays the shutter speed setting in digital or analogue form and to shutter speed control mechanism 12. The pulses output by circuit 9 are further fed to the arithmetic circuit 4 as shutter speed setting information. If the diaphragm aperture setting is to be preselected, the aperture ring is set to the desired aperture value. This causes diaphragm setting sub-circuit 8b of circuit 8 to produce an output corresponding to the selected diaphragm aperture which is fed to signal supply circuit 14. Circuit 14 produces output pulses in a number equal to diaphragm aperture index AV. These pulses are then supplied to AV counter circuit 15. The contents of AV counter circuit 15 are further fed to diaphragm setting indicator 16 which displays the diaphragm aperture setting (f-number) in a readable form and to diaphragm control circuit 17. The pulses output by circuit 14 are further fed to arithmetic circuit 4 as diaphragm aperture setting information. Similarly, if the transmittance of the variable filter is to be preselected, the filter ring is set to the desired transmittance value. This causes filter setting sub-circuit 8c of circuit 8 to produce an output corresponding to the selected filter transmittance which is fed to signal supply circuit 19. Circuit 19 produces output pulses in a number equal to the filter transmittance index FV. These pulses are then fed to FV counter circuit 20, the contents of which are supplied to filter setting indicator 21 which displays the filter transmittance in a readable form. The contents of circuit 20 are also supplied to filter control circuit 22. The pulses output by circuit 19 are further supplied to arithmetic operation circuit 4 as filter transmittance setting information. As will be noted fromt the foregoing description, illumination intensity index BV, film-speed index SV and the indices for any two exposure parameters preselected as desired from among the shutter speed, the diaphragm aperture and the filter transmittance are supplied to arithmetic circuit 4. Arithmetic circuit 4 performs arithmetic operations based on the equation (1) given earlier, and produces a number of pulses equal to the results obtained by the arithmetic operations. The output terminals of arithmetic circuit 4 are connected through inhibit (NOT) gate circuits 24, 25 and 26 to the corresponding input terminals of TV counter circuit 10, AV counter circuit 15 and FV counter circuit 20, and only the inhibit gate circuit which corresponds to the exposure control parameter not preselected is opened to allow the pulses from circuit 4 to reach the corresponding counter circuit. To TV counter circuit 10, AV counter circuit 15 and FV counter circuit 20 are respectively connected under-over signal generating circuits 27, 28 and 29 which produce under-exposure or overexposure output signals. An indication of underexposure or overexposure is displayed within the viewfinder when it is impossible to adjust the remaining exposure parameter to a setting which will give proper exposure in view of the preselected parameter settings.

The output signal of each of sub-circuits 8a, 8b and 8c of circuit 8 actuates the associated set signal supply circuit 30 to light a lamp or actuate other indicating means for the purpose of indicating which exposure parameters have been preselected. Alternatively, the signal supply circuits 30 can be eliminated by providing shutter speed setting indicator 11, diaphragm setting indicator 16 and filter setting indicator 21 so as to be visible through the viewfinder. In this arrangement, when a given exposure parameter setting is preselected, the preselected setting is displayed in the viewfinder. Thus the remaining exposure parameter which was not preset can be determined from the fact that no indication appears on the associated indicator. An explanation will now be given of the operation of the automatic exposure control apparatus of the construction described.

(1) Two exposure control parameters, for example, the shutter speed and the diaphragm aperture, are preselected by turning the associated dial rings to settings appropriate for the ambient light conditions. Setting of the shutter speed dial ring causes sub-circuit 8a of circuit 8 to produce an output signal which is fed to shutter speed setting signal supply circuit 9 and setting signal supply circuit 30a. Circuit 30a produces an indication showing that the shutter speed setting has been preselected. In the meantime, circuit 9 produces output pulses in a number equal to the shutter speed setting index TV for the preselected shutter speed setting and these pulses are fed to arithmetic circuit 4 as shutter speed setting information. The pulses produced by circuit 9 are also supplied to TV counter circuit 10 and the preselected shutter speed setting is displayed by shutter speed indicator 11 in appropriate digital or analogue form. The output of TV counter circuit 10 is also fed to shutter speed control mechanism 12 which on the basis of the signal received controls the shutter so that when released it will operate at the preselected speed. Alternatively, circuit 12 may be directly associated with the shutter speed dial rather than with TV counter circuit 10. A similar arrangement may also be employed in the case of diaphragm aperture control circuit 17 and filter control circuit 22.

Next, the aperture ring is set to an appropriate aperture value. This aperture setting causes sub-circuit 8b of circuit 8 to produce an output signal which is fed to aperture setting information signal supply circuit 14. Circuit 14 produces output pulses in a number equal to diaphragm aperture index AV for the preselected diaphragm aperture. These pulses are fed to arithmetic circuit 4 as aperture setting information, and are also supplied to AV counter circuit 15. The contents of AV counter circuit 15 are fed to aperture indicator 16 which displays the aperture setting (f-number) in an appropriate digital or analogue form. The output of AV counter circuit 15 is also fed to aperture control circuit 17 which on the basis of the signal received controls the diaphragm so that its aperture will be that preselected. The output signal of sub-circuit 8b actuates set signal supply circuit 30b which produces an indication showing that the diaphragm aperture setting has been preselected.

The intensity of the light illuminating the object to be photographed is measured by light measuring circuit 1 and the illumination intensity information signal supply circuit 2 responds to the measured illumination intensity by producing output pulses in a number equal to the illumination intensity index BV. The pulses output by circuit 2 are fed to arithmetic circuit 4 as illumination intensity information.

Similarly, the film-speed dial to set to the speed of the film loaded in the camera, and this setting causes film-speed setting circuit 5 to produce an output signal which is fed to film-speed information signal supply circuit 6. In response to the input of this signal, circuit 6 produces output pulses in a number equal to the film-speed setting index SV. The pulses produced by circuit 6 are fed to arithmetic circuit 4 as film-speed information.

The shutter speed setting information, aperture setting information, illumination intensity information and film-speed setting information are each carried by a train of pulse signals occurring at regular intervals and all pulses signals are simultaneously applied to the arithmetic circuit 4 when, for example, the shutter release button is depressed. Arithmetic circuit 4 performs the arithmetical operations, that is, adds and subtracts the numbers of pulses in accordance with the APEX system mentioned earlier and provides output pulses in a number equal to the result obtained from the arithmetic operations. Assuming that the shutter speed setting and the diaphragm aperture setting are preselected, then the sub-circuits 8a and 8b will produce output signals in response to the settings chosen for these parameters. These output signals enter the respective inhibit gate circuits 24 and 25. This leaves open only the remaining inhibit gate circuit 26. The output signals of arithmetic circuit 4 pass through inhibit gate circuit 26 to FV counter circuit 20.

The number of the input pulses received by FV counter circuit 20 is equal to the filter transmittance index FV of the filter required to obtain proper exposure. The contents of FV counter circuit 20 are fed to filter indicator 21 which displays the determined filter setting in digital or analogue form. This same information is also fed to filter control circuit 22 which automatically controls the variable filter to adjust the filter to the proper setting. If the filter transmittance index FV determined in the above arithmetic operation is beyond the range of the variable filter, the underexposure of overexposure signal generating circuit 29 is actuated to provide an indication of underexposure or overexposure. In this case, it is necessary to change the preselected shutter speed setting or diaphragm aperture setting so that a proper exposure can be obtained.

(2) When the filter transmittance and the shutter speed are preselected, the operation of the automatic control apparatus is the same as that described in (1) above except that what was said about the preselected diaphragm aperture applies to the preselected filter transmittance instead. As the operation is in other respects entirely the same, a detailed description is omitted here.

(3) The operation in the case where the filter transmittance and the diaphragm aperture are preselected is also obvious from (1) above and no detailed description is given here.

(4) When it is desired to operate a camera provided with this invention in the same manner as the conventional two parameter controlled exposure camera, it is only necessary to set the filter transmittance index FV to "0" as this setting corresponds to substantially 100% of the transmittance of the variable filter. When the filter is so set, either the shutter speed or the diaphragm aperture may be preselected and the other will be automatically controlled. It should be noted, however, that in this case it is necessary to apply the filter set signal to inhibit gate circuit 26, thereby preventing circuit 26 from being opened.

Figure 2:
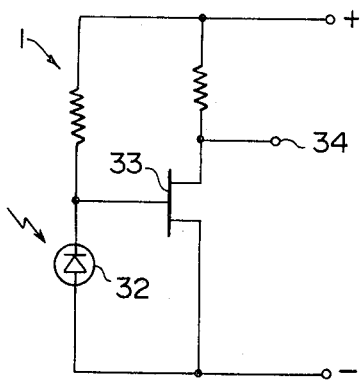
FIG. 2 is a circuit diagram illustrating a light measuring circuit in accordance with this invention.
Figure 3:
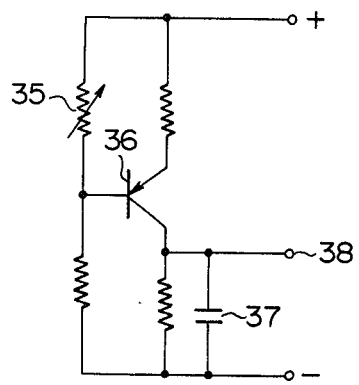
FIG. 3 is a circuit diagram illustrating a circuit in accordance with this invention for converting parameter settings into electrical signals.
Figure 4:
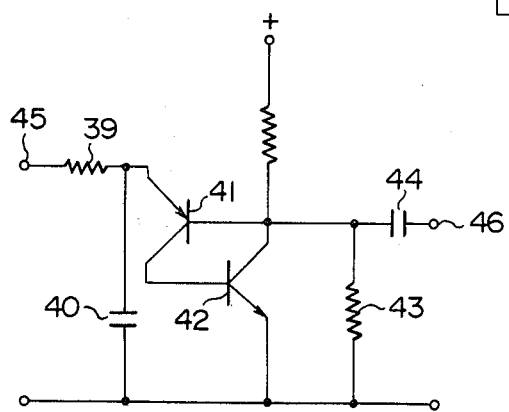
FIG. 4 is a circuit diagram illustrating a signal supply circuit in accordance with this invention.

The functions of the respective circuits have been generally described. They are now illustrated in more detail with reference to preferred embodiments thereof. FIG. 2 shows a preferred embodiment of light measuring circuit 1. In this light measuring circuit, a silicon blue cell 32 is connected between the gate and source terminals of field-effect transistor (FET) 33. Output terminal 34 connected with the drain of field-effect transistor 33 gives output voltage which is developed according to the light incident on the cell 32. FIG. 3 shows a circuit arrangement usable both for the film-speed setting circuit 5 and for the sub-circuits of circuit 8. In accordance with the circuit shown in FIG. 3, variable resistor 35 is linked with the film-speed dial, aperture ring, shutter speed dial or filter ring, as the case may be, and the resistance of variable resistor 35 is varied in accordance with the setting of the associated ring or dial. Changes in the resistance of resistor 35 cause the base voltage of transistor 36 to vary, developing voltages at the collector of transistor 36 which correspond to the film-speed setting or the setting selected for the exposure parameter concerned. The voltage at the collector charges capacitor 37 and the output voltage is taken from terminal 38. A circuit of the type shown in FIG. 3 is used in conjunction with each of four exposure parameters (all parameters illumination intensity) and the output of each such circuit is applied to an associated signal supply circuit such as that shown in FIG. 4. That is to say, a circuit of the type shown in FIG. 4 is used for circuits 2, 6, 9, 14 and 19 in FIG. 1.

Figure 5:
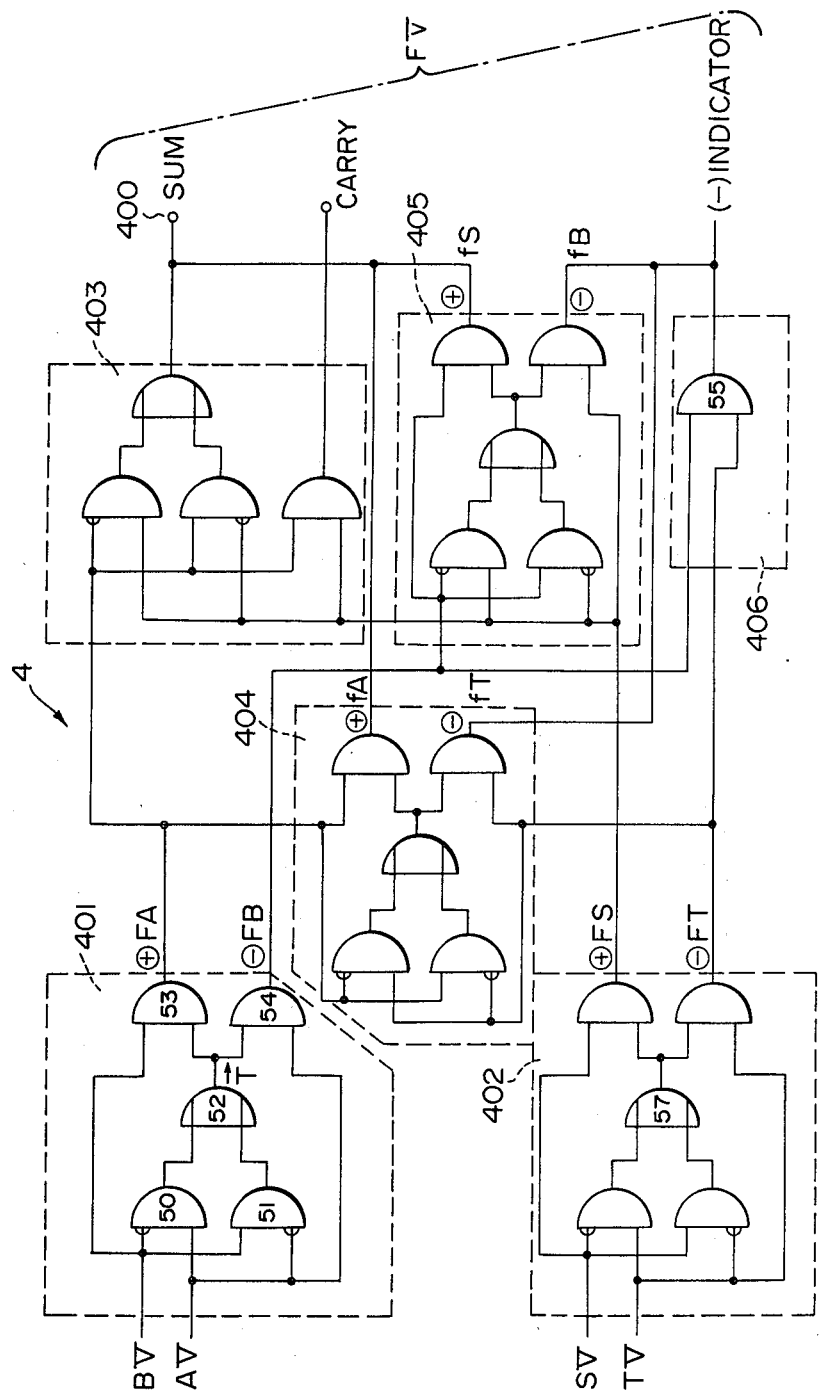
FIG. 5 is a circuit diagram illustrating an arithmetic circuit in accordance with this invention.

The function of each of these circuits is to produce output signals corresponding to the index of the exposure parameter (illumination intensity, film speed, shutter speed, diaphragm aperture or filter transmittance) to which it is related. As shown in FIG. 4, the signal supply circuit includes an integrating circuit consisting of resistor 39 and capacitor 40, a switching circuit consisting of two transistors 41 and 42 connected to the intergrating circuit, and a differentiating circuit consisting of resistor 43 and capacitor 44 connected to the switching circuit. As input voltage is applied to input terminal 45, capacitor 40 charges to a given level. Reaching the given level of charge, capacitor 40 discharges, switching on transistors 41 and 42 causing output pulses to appear at output terminal 46. Since the signal supply circuit is actuated only during a fixed period of time, for example, from depression of the shutter release button to the upward swing of the mirror, it provides output pulse signals in a number corresponding to the input voltages. As the length of the output pulses varies with the input voltage, registers or the like are used to convert them into pulses of uniform length appropriate for use in the arithmetic operation. The output pulses produced by the signal supply circuit are then applied to arithmetic circuit 4 of an arrangement such as that shown in FIG. 5. As shown in FIG. 5, circuit 4 comprises first block 401 which consists of inhibit gate elements 50, 51, OR gate element 52 and AND elements 53, 54 and second to sixth blocks 402 to 406. The digital operation performed by circuit 4 is $FV = (BV - AV) + (SV - TV)$ which is a variation derived from equation (1), i.e., $BV + SV + AV - TV - FV = 0$. Similar variations are used to calculate TV when AV and FV are preselected and to calculate AV when TV and FV are preselected. In circuit 4, first, second, fourth and fifth blocks 401, 402, 404 and 405 are of similar arrangement and each includes two inhibit gate elements, one OR gate element and two AND elements. To avoid repetitious explanation, only the operation of first block 401 is described below. It should be understood that the operation of the blocks 402, 404 and 405 is similar. On receipt of BV and AV signals, the logic circuit of first block 401 provides output pulse signals from OR gate element 52 and AND gate elements 53 and 54 in accordance with Table 2.

Table 2

| BV signal | AV signal | T output | FA output | FB output |
|---|---|---|---|---|
| 0 | 0 | 0 | 0 | 0 |
| 1 | 0 | 1 | 1 | 0 |
| 0 | 1 | 1 | 0 | 1 |
| 1 | 1 | 0 | 0 | 0 |

Figure 6:
FIG. 6 illustrates the pulse operating in the arithmetic circuit of FIG. 5.
Figure 6:
Figure 6:

When, for example, the pulses appearing at BV and AV in FIG. 5 are as shown in FIG. 6, that is, when four input pulses appear at BV and two input pulses appear to AV, two output pulses are produced by OR gate element 52 in accordance with Table 2. In other words, the logic circuit performs the operation of (BV − AV). The other blocks perform similar logical operations so that the result is as follows:

For the first block:
If BV > AV, output signal FA is produced by AND element 53 as indicated by a plus (+) sign; and
If BV < AV, output signal FB is produced by AND element 54 as indicated by a minus (−) sign.
For the second block:

If SV > TV, output signal FS appears at the output of the AND element indicated by a plus (+) sign; and If SV < TV, output signal FT appears at the output of the AND element indicated by a minus (−) sign.

For the fourth block:

The outputs of the first and second blocks are added, and if FA > FT, output signal fA appears at the output of the AND element indicated by a plus (+) sign; and If FA < FT, output signal fT appears at the output of the AND element indicated by a minus (−) sign.

For the fifth block:

The outputs of the first and second blocks are added, and if FS > FB, output signal fS appears at the output of the AND element indicated by a plus (+) sign; and If FS < FB, output singal fB appears at the output of the AND element indicated by a minus (−) sign.

Third block 403 constitutes a semi-adder, and performs logical operations in accordance with Table 3.

Table 3

| FA | FS | Sum | Carry |
|----|----|-----|-------|
| 0  | 0  | 0   | 0     |
| 1  | 0  | 1   | 0     |
| 0  | 1  | 1   | 0     |
| 1  | 1  | 0   | 1     |

The output of third block 403 is taken as the output of arithmetic circuit 4. Sixth block 406 provides minus (−) output signals through AND element 55 from the output FB(−) of first block 401 and the output FT(−) of second block 402. The output signals fT and fB are both represented by minus sign. The minus representation is not shown in the circuit of FIG. 1. Instead of the minus representation, the circuit of FIG. 1 is provided with underexposure or overexposure signal supply circuits 27, 28 and 29. When the output signal of circuit 4 turns minus the minus, information is indicated as a warning signal through signal supply circuits 26, 27 and 28.

Figure 7:
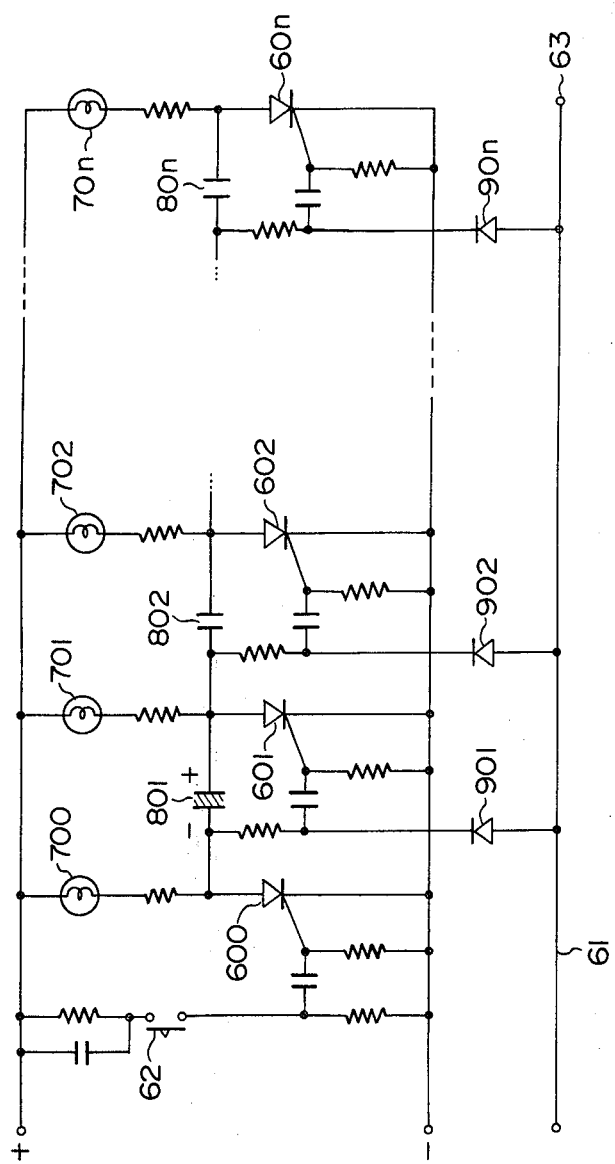
FIG. 7 is a circuit diagram illustrating a counter circuit including an indicator in accordance with this invention.
Figure 8:
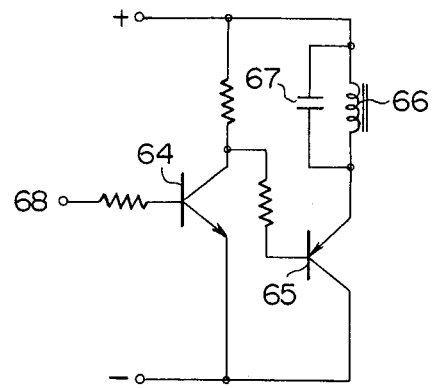
FIG. 8 is a circuit diagram illustrating a control circuit in accordance with this invention.
Figure 9:
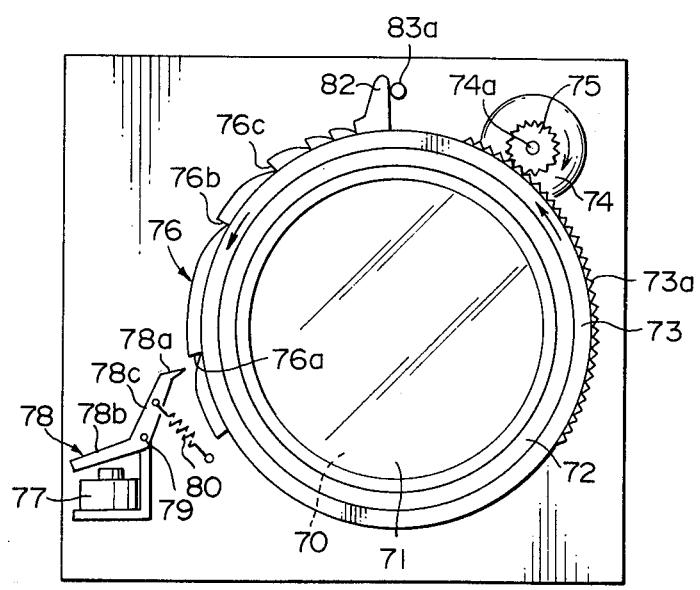
FIG. 9 is a front view illustrating the construction of a filter control mechanism in accordance with this invention.

In a case where the film speed is ASA 3200 and illumination intensity index BV is 4, assume that a shutter speed of 1/250 and aperture of $f4$ are preselected and the filter value is automatically set thereafter. In such case, film speed index SV is 10, diaphragm aperture index Av is 4 and shutter speed TV index is 8 in accordance with Table 1. Consequently, the output of OR gate element 52 is "0" and OR gate element 57 provides two pulses. The output pulses of OR gate element 57 are gated through an AND element and two output pulses are produced at output FS of the AND element. The two output pulses go through the third block 403 and are output therefrom. In other words, arithmetic circuit 4 performs operations according to equation (1), and the two output pulses which result from the arithmetic operation appear at output terminal 400 of block 403. The output of arithmetic circuit 4 passes through inhibit gate element 26 (see FIG. 1) into FV counter circuit 20, and circuit 20 controls the variable filter automatically in response to the input pulses from element 26. This is because in this instance the filter value setting was not first preselected. As FV counter circuit 20, TV counter circuit 10 and AV counter circuit 15, there can be used, for example, a thyristor ring counter such as that shown in FIG. 7. This counter includes $n$-th number of thyristors 600, 601, ... 60$n$. To the anodes of thyristors 600, 601, ... 60$n$ are connected indicators 700, 701, ... 70$n$. Indicators 700, etc. may employ lamps, liquid crystal elements or LED's, to display the related exposure parameter settings in digital or analogue form in a manner visible through the viewfinder. Filter indicator 21, shutter speed indicator 11 and aperture indicator 16 are each constituted of indicators 700 etc. of the associated counter circuit. Commutating capacitors 801, 802, ... 80$n$ are connected between adjacent anodes of thyristors 600, etc. The gates of second thyristor 601 and subsequent thyristors 602, etc. are connected through corresponding diodes 901, 902, ... 90$n$ to shift line 61. When start switch 62 is closed, a pulse is applied to the gate of thyristor 600 which is turned on thereby. At this time, the two previously mentioned output pulses from output terminal 400 of arithmetic circuit 4 are fed through shift line 61, the first pulse causing thyristor 601 to turn on while discharging commutating capacitor 801 thereby turning off thyristor 600. In other words, conduction of thyristor 600 causes only diode 901 to be forward-biased, and therefore only the gate of thyristor 601 is pulsed. The other output pulse of output terminal 400 is fed to the gate of thyristor 602, turning on thyristor 602 while turning off thryristor 601. Conduction of thyristor 602 causes indicator 702 to turn on making visible the numeral "2". At the same time, shutter speed indicator 11 and aperture indicator 16, both of which are constructed similarly to indicators 701, etc., display the shutter speed of "1/250" and the aperture $f$-number "4". The counter circuit described above (shown in FIG. 7) produces two output pulses at output terminal 63 thereof, and these two pulse signals are then fed to a control circuit as shown in FIG. 8. The control circuit shown is that used for filter control circuit 22, shutter speed control circuit 12 and aperture control circuit 17. As shown in FIG. 8, the control circuit includes a coil assembly 66 having one terminal connected to the collector of transistor 64 and the other terminal connected to the emitter of transistor 65. A capacitor 67 is connected parallel with the coil assembly 66. In the above arrangement, when the two pulses from FV counter circuit 20 are applied to input terminal 68, the pulses are amplified by the transistors 64 and 65, energizing coil 66 two times. Energization of coil assembly 66 causes the filter control mechanism to be driven so as to rotate the variable filter and thereby adjust its transmittance. In the example operation under consideration, the transmittance is adjusted to $\frac{1}{4}$. The variable filter can be any of various kinds of filter means having controllable transmittance. For example, it can be comprised of a combination of a fixed polarizing filter and a rotatable polarizing filter superposed one over the other. In this form of filter, the rotatable filter is rotated to adjust the transmittance of the filter. FIG. 9 is a front view of a filter control mechanism according to this invention for adjusting the transmittance of a filter means of the type just described. Referring to FIG. 9, the construction of the filter control mechanism is illustrated in detail. Over fixed polarizing filter 70 is disposed polarizing filter 71 which is rotatable about its optical axis. Rotatable filter 71 is fixed to filter drive ring 72 which is provided with flanged portion 73. Flanged portion 73 has a toothed portion 73$a$ formed on a part of the outer periphery thereof. Pinion 75 is fixed to shaft 74$a$ of a motor 74 and is engaged with the teeth of toothed portion 73$a$. Rotation of motor 74 is transmitted to filter drive ring 72 through pinion 75 and toothed portion 73$a$ to rotate filter drive ring 72 and rotatable polarizing filter 71. Flanged portion 73 of filter drive ring 72 is provided with ring stop 82 having a number of teeth 76a, 76b, 76c, etc. which serve as stoppers for preventing rotation of filter drive ring 72. Teeth 76a, etc. of the ring stop portion 76 are engaged by pawl 78a of lever 78 which is driven by electromagnet assembly 77 actuated to control the amount of rotation of filter drive ring 72. Said lever 78 prevents rotation of drive ring 72 by causing pawl 78a to engage with toothed portion 76. Electromagnet assembly 77 corresponds to coil assembly 66 shown in FIG. 8. Lever 78 is pivotally supported by shaft 79, and when one arm 78b of lever 78 is magnetically attracted by electromagnet 77, the other arm 78c of lever 78 rotates on shaft 79 in a counterclockwise direction against the action of spring 80, disengaging pawl 78a of lever 78 from adjoining tooth 76a of toothed portion 76. The variable polarizing filter assembly is at maximum transmittance when rotatable polarizing filter 71 is in its initial position before motor 74 starts to rotate. Rotation of filter drive ring 72 in the counterclockwise direction in FIG. 9 causes rotating filter 71 to rotate so as to reduce the transmittance of variable filter. Teeth 76a, 76b, 76c, etc. on flanged portion 73 of filter drive ring 72 are so spaced that when filter drive ring 72 rotates by one tooth in the counterclockwise direction, the transmittance of variable filter 71 is decreased by one-half. That is to say, the positions of teeth 76a, etc. are so determined that starting with the maximum transmittance of the variable filter and assigning the value of 1 to this maximum transmittance, the transmittance is made to decreases to one-half, one fourth, one eighth, one sixteenth, and so on as drive ring 72 rotates one tooth at a time in the counterclockwise direction. Thus, the position at which pawl 78a engages tooth 76a corresponds to a transmittance index FV of "0", that where it engages tooth 76b corresponds to an FV of 1, and that where it engages tooth 76c corresponds to an FV of 2.

Motor 74 is driven to rotate filter drive ring 72 during the period that pulse signals are fed to electromagnet 77. Energization of electromagnet 77 causes arm 78b of lever 78 to be attracted thereto to thereby disengage pawl 78a from a tooth of toothed portion 76. During this period of disengagement, drive ring 72 is moved the required distance. When the preselected exposure parameters are the shutter speed and the diaphragm aperture, the output pulses (in this example, two) of FV counter circuit 20 are applied to electromagnet 77, and electromagnet 77 is energized two times. Concurrently with the period of the two pulses, filter drive ring 72 is driven by motor 74 to rotate by a distance equal to two teeth. In this instance, the drive ring moves the distance of two teeth during the period of the two pulses and is then stopped at the position of tooth 76c which is engaged by pawl 78a of lever 78. The position corresponds to that at which the transmittance of the variable filter is "¼", the value required for proper exposure. It should be noted that the combined length of the two pulses must be no larger than required to allow drive ring 72 to move the required distance during the period thereof so that pawl 78a of the lever 78 will engage the appropriate tooth, tooth 76c in this case. In other words, drive ring 72 should not move so fast as to overshoot the appropriate tooth during the interval.

Figure 10:
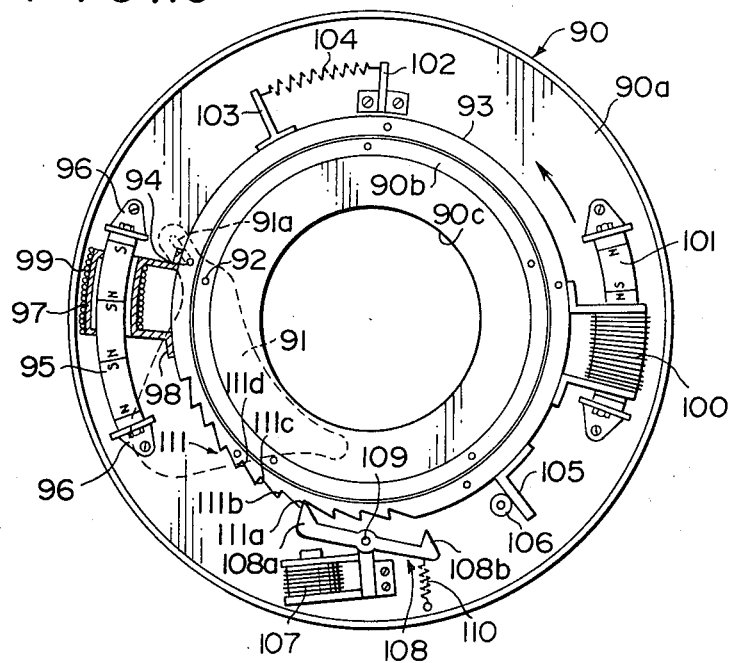
FIG. 10 is a front view illustrating the construction of a diaphragm aperture control mechanism in accordance with this invention, showing the diaphragm blades in the fully open position.
Figure 11:
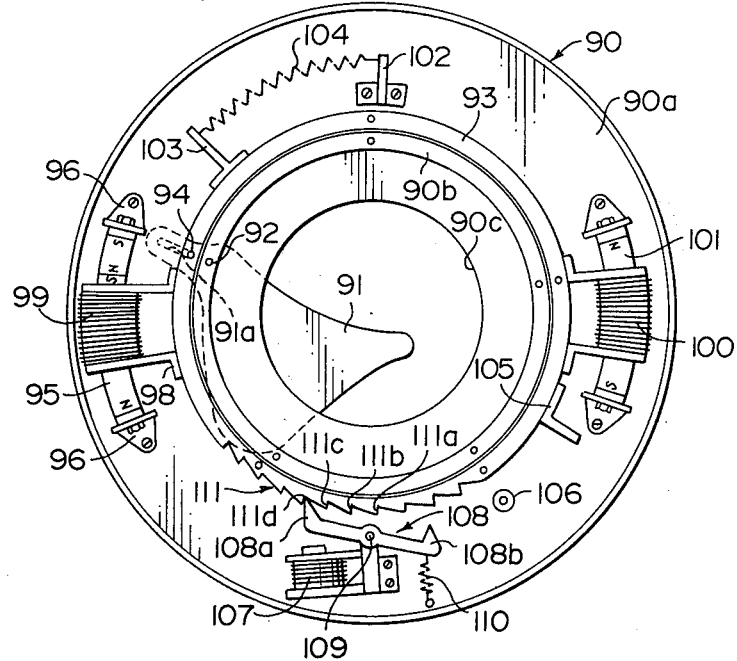
FIG. 11 is a front view of the mechanism shown in FIG. 10 showing the blades in the closed position.

When the shutter speed and filter transmittance are preselected, the diaphragm is automatically set to the appropriate aperture by means of a diaphragm aperture control mechanism controlled by output pulses from arithmetical circuit 4. An embodiment of a diaphragm aperture control mechanism according to this invention is shown in FIGS. 10 and 11. Housing 90 of a photographic shutter and other elements includes base plate 90a forming an integral part thereof and inner pipe socket 90b rising from base plate 90a concentrically with housing 90, base plate 90a defining a space in the form of a concentric channel open at the top between housing 90 and pipe socket 90b. Base plate 90a of housing 90 is provided with central aperture 90c. A plurality of diaphragm blades 91 are pivotally supported on corresponding pins 92 at the rear of base plate 90a, and have a range of movement between maximum and minimum aperture. For the convenience illustration, only one blade 91 is shown as representative of the others. Blades 91 are each provided with substantially rectangular slot 91a wherein pin 94 is inserted, pin 94 being provided on blade drive ring 93 and projecting through a substantially arcuate rectangular slot (not shown) provided along base plate 90a of housing 90 in the direction of rotation of blade drive ring 93. Adjustment of the diaphragm aperture can be effected by rotating drive ring 93 in clockwise or in counterclockwise direction. Generally arcuate permanent magnet assembly 95 consists of a plurality of permanent magnets with the opposite poles of adjoining magnets being joined as shown, and is fixed to base plate 90a of housing 90 by means of mounting member 96. Bobbin 97 of generally arcuate form fits around magnet assembly 95 with an internal clearance therebetween. Bobbin 97 includes mounting member 98 by which it is fixed to driving ring 93. A coil of wire 99 is wound around bobbin 97 so that when an electric current is passed therethrough, coil 99 is repelled and attracted by the magnet assembly 95 thus causing driving ring 93 to rotate counterclockwise and rotating diaphragm blade 91 to the closed position as indicated in FIG. 11. As will be noted, bobbin coil 99 and magnet assembly 95 coact as the drive means for moving diaphragm blade 91 to the closed position. Bobbin coil 100 and permanent magnet assembly 101 are provided on the opposite side of blade driving ring 93 and base plate 90a from coil 99 and magnet 95. Bobbin 100 and magnet assembly 101 coact to rotate diaphragm ring 93 clockwise to open the diaphragm aperture. Spring 104 is connected between support member 102 secured to base plate 90a of housing 90 and support member 103 secured to the outer periphery of blade driving ring 93. Spring 104 normally biases blade driving ring 93 toward the position indicated in FIG. 10 in which stop lever 105 of ring 93 abuts against stop 106. On base plate 90a of housing 90 is provided electromagnet assembly 107 which is energized each time the output pulse signals of AV counter circuit 15 are applied thereto. Electromagnet assembly 107 corresponds to coil assembly 66 shown in FIG. 8, and includes ratchet 108 swingably pivoted on pin 109 and having pawls 108a, 108b at opposite ends. Energization of electromagnet 107 causes pawl 108a to be attracted thereto thus rotating ratchet 108 in counterclockwise direction, whereas deenergization electromagnet 107 causes pawl 108b to be pulled by the action of spring 110 which normally biases pawl 108b downwardly thus rotating ratchet 108 in clockwise direction. Ratchet gear 111 having an appropriate number of teeth 111a, 111b, 111c, etc. is formed on the outer periphery of diaphragm ring 93, and each tooth of ratchet gear 111 corresponds to a different stop of the diaphragm aperture. Thus, when pawl 108a of ratchet 108 engages tooth 111a of ratchet gear 111, the size of the aperture in terms of f-number is set to "1"; when ratchet 108 engages tooth 111b, it is set to "1.4"; when ratchet 108 engages tooth 111c, it is set to "2.0"; and so on. In terms of aperture index FV, therefore, tooth 111a corresponds to "0", tooth 111b to "1", tooth 111c to "2", and so on. When one pulse signal is applied to electromagnet 107 at the time bobbin coil 99 is conducting, ratchet 108 swings in counterclockwise direction disengaging pawl 108a from tooth 111a of ratchet gear portion 111. At the same time, pawl 108b of ratchet 108 engages the intermediate point between two adjacent teeth so that ratchet gear 111 is allowed to move a distance equal to half a pitch. Next, when electromagnet 107 is deenergized, ratchet 108 is swung in clockwise direction by the action of spring 110 disengaging pawl 108b from the tooth of ratchet gear 111 while placing pawl 108a in contact with the intermediate point between tooth 111a and tooth 111b. Thus, ratchet gear 111 is allowed to move in clockwise direction by the distance of another half pitch. As will be noted from the above, applying one pulse signal to electromagnet 107 causes ratchet gear 111 to be moved by one tooth, thus closing diaphragm blades 91 by one stop. When, for example, aperture index AV is set to "3", AV counter circuit 15 shown in FIG. 1 provides three output pulses which move ratchet gear 111 a distance equal to three teeth as indicated in FIG. 11. Diaphragm blades 91 are thus moved to a position which corresponds to the fourth stop of the aperture corresponding to the f-number "2.8". When the shutter release button (not shown) is depressed the shutter blades open and then close. Upon closure of the shutter, bobbin coil 99 is rendered nonconductive while bobbin coil 100 rendered conductive for a fixed period of time so that the coil 100 coacts with magnet assembly 101 to rotate diaphragm ring 93 clockwise. Thus, diaphragm blades 91 return to the open position shown in FIG. 10. As a shutter speed control mechanism is known in which the shutter speed control is effected in a digital manner in accordance with a number of pulses, the structure and operation of such a mechanism is not described herein.

Figure 12:
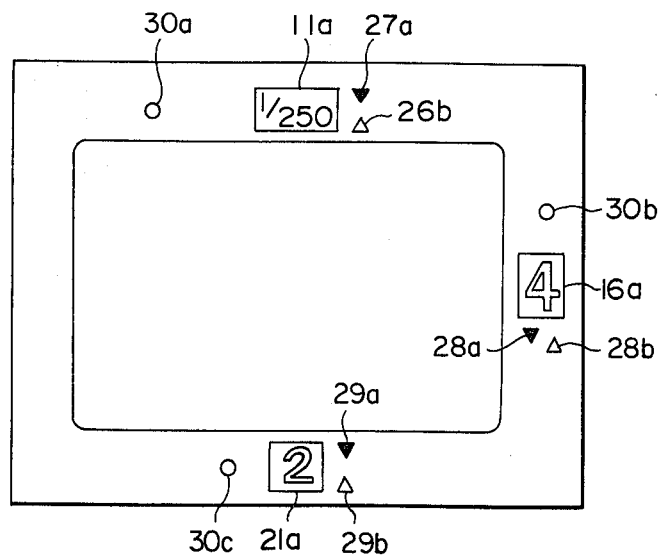
FIG. 12 is a front view of a viewfinder for use with the present invention.

FIG. 12 indicates a front view of an indicator according to the invention for visually displaying the controlled exposure parameters within the viewfinder. As shown in FIG. 12, there is provided at the upper portion of the viewfinder indicator 11a which is a part of shutter speed setting indicator circuit 11 shown in FIG. 1. Indicator 11a displays the shutter speed setting in digital form as can be seen from the indication of "1/250" shown. A pair of indicators 27a and 27b are provided on the right of indicator 11a. These indicators are a part of overexposure or underexposure signal supply circuit 27 and one indicator 27a provides overexposure information while the other indicator 27b provides underexposure information. Indicators 27a and 27b are lamps and if either is lit, it is necessary to reset the preselected setting of either the diaphragm aperture or the filter transmittance so that appropriate exposure can be obtained. Shutter speed preselect indicator 30a is a part of shutter speed setting signal supply circuit 8a which operates to light indicator 30a when the shutter speed has been preselected. Instead of indicator 29a which indicates when the shutter speed has been preselected, it is possible to indicate when the shutter speed has not been peselected by leaving the lamp of indicator 11a off. Similarly, there are provided indicator 16a which is a part of aperture setting indicator circuit 16, indicators 28a and 28b which are parts of overexposure or underexposure signal supply circuit 28 and indicator part 30b which is a part of setting signal circuit 8b. The indicator 16a displays the diaphragm aperture in terms of f-number such as can be seen, for example, from the "4" shown. Furthermore, there are provided indicator 21a which is a part of filter setting indicator circuit 21, indicators 29a and 29b which are parts of overexposure or underexposure signal supply circuit 29, and indicator 30c which is a part of setting signal supply circuit 8c. As illustrated above, the settings of the various exposure parameters are displayed in visual form within the viewfinder, and in taking a picture, therefore, the photographer can choose the appropriate exposure parameter settings in consideration of the ambient light conditions and the photographic effect desired.

In accordance with the automatic exposure control apparatus of this invention, any two of the shutter speed setting, diaphragm aperture setting and filter transmittance setting can be preselected and the remaining one of these will be set automatically thereafter so that the appropriate exposure can be obtained under any conditions of ambient light.

Although the invention has been illustrated with reference to several preferred embodiments thereof, it should be understood that various changes and modifications may be made without departing from the spirit and scope of the invention.

I claim:
1. An automatic exposure control apparatus in a photographic camera for automatic setting of exposure parameters wherein exposure is controlled by the selection of three exposure parameters, namely, diaphragm aperture, shutter speed and filter transmittance, said exposure control apparatus comprising:
light measuring means for measuring the intensity of light incident upon an object and producing an illumination intensity signal;
film-speed setting means for producing a film-speed setting signal which indicates the speed of the film loaded in the camera;
diaphragm aperture setting means for producing a diaphragm aperture setting signal indicative of the diaphragm aperture when the same is manually set;
shutter speed setting means for producing a shutter speed setting signal indicative of the shutter speed when the same is manually set;
filter transmittance setting means for producing a filter transmittance setting signal indicative of the filter transmittance when the same is manually set;
first pulse signal supply means connected to said light measuring means and producing a number of pulses proportional to said illumination intensity signal;
second pulse signal supply means connected to said film-speed setting means and producing a number of pulses proportional to said film-speed setting signal;
third pulse signal supply means connected to said shutter speed setting means and producing a number of pulses proportional to said shutter speed setting signal;
fouth pulse signal supply means connected to said diaphragm aperture setting means and producing a number of pulses proportional to said diaphragm aperture setting signal;
fifth pulse signal supply means connected to said filter transmittance setting means and producing a number of pulses proportional to said filter transmittance setting signal;

diaphragm aperture control means for adjusting the diaphragm aperture to the value set on said diaphragm aperture setting means;

shutter speed control means for adjusting the shutter speed to the value set on said shutter speed setting means;

filter transmittance control means for adjusting the filter to the value set on said filter transmittance setting means; and arithmetic means responsive to the output pulse signals of any two of said third, fourth and fifth pulse signal supply means and the output pulse signals of said first and second pulse signal supply means;

whereby any two of the diaphragm aperture setting means, the shutter speed setting means and the filter transmittance setting means are preset at desired settings and the remaining one is automatically controlled in accordance with the output of said arithmetic means.

2. An apparatus as defined in claim 1, wherein said apparatus further comprises indicating means actuated in response to said output of said arithmetic means for displaying indications of the controlled exposure parameters settings in readable forms.

3. An automatic exposure control apparatus in a photographic camera for automatic setting of exposure parameters wherein exposure is controlled by the selection of three exposure parameters, namely, diaphragm aperture, shutter speed and filter transmittance, said exposure control apparatus comprising:

light measuring means for measuring the intensity of light incident upon an object and producing an illumination intensity signal;

film-speed setting means including a film-speed setting dial and a film-speed setting signal supply means for producing a film-speed setting signal when said dial is set to indicate the speed of the film loaded in the camera;

diaphragm aperture setting means including diaphragm aperture setting signal supply means for producing a diaphragm aperture setting signal;

shutter speed setting means including shutter speed setting signal supply means for producing a shutter speed setting signal;

filter transmittance setting means including filter transmittance setting signal supply means for producing a filter transmittance setting signal;

first pulse signal supply means connected to said light measuring means and producing a number of pulses proportional to said illumination intensity signal;

second pulse signal supply means connected to said film-speed setting signal supply means and producing a number of pulses proportional to said film-speed setting signal;

third pulse signal supply means connected to said shutter speed setting signal supply means and producing a number of pulses proportional to said shutter speed setting signal, said third pulse signal supply means including shutter speed counter means;

fourth pulse signal supply means connected to said diaphragm aperture setting signal supply means and producing a number of pulses proportional to said diaphragm aperture setting signal, said fourth pulse signal supply means including diaphragm aperture counter means;

fifth pulse signal supply means connected to said filter transmittance setting signal supply means and producing a number of pulses proportional to said filter transmittance setting signal, said fifth pulse signal supply means including filter transmittance counter means;

diaphragm aperture control means responsive to the output pulses of said diaphragm aperture counter means for adjusting the diaphragm aperture to the value set on said diaphragm aperture setting means;

shutter speed control means responsive to the output pulses of said shutter speed counter means for adjusting the shutter speed to the value set on said shutter speed setting means;

filter transmittance control means responsive to the output pulses of said filter transmittance counter means for adjusting the filter to the value set on said filter transmittance setting means; and arithmetic means responsive to the output pulse signals of any two of said third, fourth and fifth pulse signal supply means and the output pulse signals of said first and second pulse signal supply means;

whereby any two of the diaphragm aperture setting means, the shutter speed setting means and the filter transmittance setting means are preset at desired settings and the remaining one is automatically controlled in accordance with the output of said arithmetic means.

4. An apparatus as defined in claim 3, wherein said apparatus further comprises three indicator means respectively actuated by said output signals of said shutter speed counter means, said diaphragm aperture counter means and said filter transmittance counter means for visually displaying the settings for the two preset parameter settings among the shutter speed setting, the diaphragm aperture setting and the filter transmittance setting, said indicating means including means which selectively deactuates the indicator relating to the parameter not preset.

* * * * *